(12) United States Patent
Tarr

(10) Patent No.: US 6,978,314 B2
(45) Date of Patent: Dec. 20, 2005

(54) SYSTEM AND METHOD FOR LOCATING DEVICES ON A LOCAL AREA NETWORK

(75) Inventor: Stephen F. Tarr, Portland, OR (US)

(73) Assignee: Xerox Corporation, Stamford, CT (US)

( * ) Notice: Subject to any disclaimer, the term of this patent is extended or adjusted under 35 U.S.C. 154(b) by 672 days.

(21) Appl. No.: 10/083,003

(22) Filed: Feb. 26, 2002

(65) Prior Publication Data

US 2003/0163583 A1   Aug. 28, 2003

(51) Int. Cl.[7] ............................................ G06F 15/16
(52) U.S. Cl. ...................... 709/245; 709/220; 709/223; 370/432; 370/254
(58) Field of Search ........................ 709/220, 223–224, 709/245, 249; 370/401, 432, 254

(56) References Cited

U.S. PATENT DOCUMENTS

| | | | | |
|---|---|---|---|---|
| 5,185,860 A | * | 2/1993 | Wu | 709/224 |
| 5,511,208 A | * | 4/1996 | Boyles et al. | 709/223 |
| 5,710,885 A | * | 1/1998 | Bondi | 709/224 |
| 5,835,720 A | * | 11/1998 | Nelson et al. | 709/224 |
| 5,835,725 A | | 11/1998 | Chiang et al. | 395/200.58 |
| 6,009,103 A | * | 12/1999 | Woundy | 370/401 |
| 6,192,417 B1 | * | 2/2001 | Block et al. | 709/249 |
| 6,249,814 B1 | * | 6/2001 | Shaffer et al. | 709/223 |
| 6,480,506 B1 | * | 11/2002 | Gubbi | 370/468 |
| 6,516,345 B1 | * | 2/2003 | Kracht | 709/220 |
| 6,601,093 B1 | * | 7/2003 | Peters | 709/220 |
| 6,735,200 B1 | * | 5/2004 | Novaes | 370/390 |
| 2002/0013807 A1 | * | 1/2002 | Richard | 709/202 |
| 2002/0161867 A1 | * | 10/2002 | Cochran et al. | 709/221 |
| 2003/0005100 A1 | * | 1/2003 | Barnard et al. | 709/223 |
| 2003/0039215 A1 | * | 2/2003 | Eatough et al. | 370/254 |
| 2003/0069954 A1 | * | 4/2003 | Ma et al. | 709/223 |
| 2003/0097425 A1 | * | 5/2003 | Chen | 709/220 |
| 2003/0112765 A1 | * | 6/2003 | Gaspard et al. | 370/252 |
| 2005/0030955 A1 | * | 2/2005 | Galin et al. | 370/401 |

FOREIGN PATENT DOCUMENTS

| | | |
|---|---|---|
| EP | 1 168 711 A1 | 1/2002 |
| WO | WO 98/18306  *  | 5/1998 |

OTHER PUBLICATIONS

Hwa-Chun Lin, Shou-Chuan Lai, Ping-Wen Chen, Hsin-Liang Lai, "Automatic Topology Discovery of IP Networks," IEICE Transactions on Information and Systems, Institute of Electronics Information and Comm. Eng. Tokyo, Japan, Jan. 2000, vol. 83-D, No. 1, pp. 71-78.

(Continued)

*Primary Examiner*—Philip B. Tran
(74) *Attorney, Agent, or Firm*—Jeannette Walder

(57) ABSTRACT

A system for network device location, includes an address server for associating IP addresses of devices on the network with a group name; a discoverable device located on a first subnet of the network, wherein the discoverable device has an IP address, and wherein the discoverable device's IP address is associated with the group name; and a discovering device, located on a second subnet of the network, for creating a list of known subnets and known devices on the network; for querying the name server for a list of IP addresses associated with the group name; for contacting each returned address of a discoverable device associated with the group name for the discoverable device's IP subnet information; for determining the discoverable device's subnet; and for adding the discoverable device and its subnet to the list.

11 Claims, 1 Drawing Sheet

OTHER PUBLICATIONS

A. Gulbrandsen, P. Vixie, L. Esibov, "A DNS RR for specifying the location of services (DNS SRV)," RFC 2782, Feb. 2000, pp. 1-12.

Erik Guttman, "Service Location Protocol: Automatic Discovery of IP Network Services," IEEE Internet Computing, IEEE Service Center, Piscataway, New Jersey, Jul. 1999, vol. 3, No. 4, pp. 71-80.

J. Schonwalder, H. Langendorfer, "How to Keep Track of Your Network Configuration," Proc. of the Systems Administration Conference, Lisa, Nov. 1993, pp. 101-105.

J. Veizades 1997 rfc2165 ("Service Location Protocol"—Internet Request for Comments 2165).

U.S. Appl. No. 09/199,935, filed Nov. 25, 1998, Joydeep Roy et al.

* cited by examiner

SYSTEM AND METHOD FOR LOCATING DEVICES ON A LOCAL AREA NETWORK

CROSS-REFERENCE TO RELATED APPLICATION

This application is related to pending U.S. patent application Ser. No. 09/199,935 to Roy et al., System for Network Device Location, assigned to the assignee of this application, which is incorporated herein by reference and made a part hereof (the "935 application").

FIELD OF THE INVENTION

The present invention relates generally to a system and method of locating devices on a network, and more particularly to a system and method of locating network devices on remote subnets.

BACKGROUND OF THE INVENTION

Some users of devices residing on a network find it desirable to locate all or a class of other devices on the network. For example, a user may wish to have a list of all the printers of a certain brand, along with information about those printers that are on the same sub-network. Many networked printers are delivered with software which allows users to install the printer's driver onto a user's host device. This installer software allows users to search for printers on their network. However, if the printer was attached to a different IP subnet than the user's host device, the installer could not locate the printer(s) without additional input from the user. Since many of users are not technically knowledgeable about their company's network topology, they could not answer the questions prompted them by the installer and could not find the printer to be installed.

There are many problems with existing tools for locating devices on networks. First, traditional management tools generally only find devices of a particular manufacture or type. For example, CISCO tools only find CISCO devices; 3COM tools only find 3COM devices.

Second, using existing protocols, such as Simple Network Management Protocol (SNMP) typically means searching for other devices on the network by sending (User Datagram Protocol) UDP messages to the sub-network and then waiting for particular responses from network devices that are listening on the same sub-network. UDP is a protocol that offers a limited amount of service when messages are exchanged between network devices in a network that uses the Internet Protocol (IP). A persistent problem with UDP alone is the loss of information packets due to congestion in the network or the receiving device.

A third problem also exists when attempting to locate or find devices with no IP address. Service Location Protocol (SLP), described in the Internet Request For Comments document 2165 (RFC 2165), has been used as a substitute or to supplement UDP-based SNMP broadcast and responses. SLP provides a means to send a list of devices that have already responded in the broadcast request such that those who have already responded will not do so again. However, using SLP may result in slower and more cumbersome location of devices on the network because of it's complexity and lack of specialization.

Another problem with traditional network management tools using IP multicasting is that they talk to routers which require registration with the router. Furthermore, registration with routers is considered to be a security risk for some applications by many.

The 935 application overcomes many of these problems. The 935 application describes a system and method for network device location that provides a faster and more exhaustive search, and uniquely identifies those devices on the same subnet without relying on their IP address. A system for network device location, according to the 935 application, includes a first device for sending an HTTP request to a device having a known location on the network for a list of addresses of devices on the network; and a second device having a known location on the network, responsive to the HTTP request, for sending a DLP (device location protocol) request to devices on the network, responsive to DLP responses from devices on the network, for generating a list of network addresses of responding devices on the network, and for sending the list of network addresses of devices on the network to the first device; wherein the DLP request includes a list of network addresses of devices that have previously responded such that only those devices not on the list will respond; and wherein the length of each network address is included before each network address in the list. The 935 application also describes a system and method which assigns an IP address to devices on the network.

It would be desirable to improve the device search capabilities of a network management tool so it can find devices on remote subnets without user intervention. It would be desirable to improve the search capabilities of a printer driver installer so that, in many cases the installer can find printers on remote subnets without user intervention. It would also be desirable to improve the device search capabilities of a network management tool so that the tool can find devices, such as printers that have not been assigned an IP (Internet Protocol) address.

SUMMARY OF THE INVENTION

A method of locating devices on a network, according to the invention, includes identifying a group name which may be associated with multiple addresses on the network; creating a list of known subnets and known devices on the network; querying a name server for a list of IP addresses associated with the group name; contacting each returned address associated with the group name for the discovered device's IP subnet information; determining the discovered device's subnet; and adding the discovered device and it's subnet to the list. Once at least one discoverable device is located and its subnet identified, then an alternative discovery protocol, such as the broadcast-based discovery protocol described in the 935 application, or a protocol based on knowing a range of IP addresses, or some other discovery protocol may be used to locate other devices on the identified subnet.

A system for network device location, according to the invention, includes an address server for associating IP addresses of devices on the network with a group name; a discoverable device located on a first subnet of the network, wherein the discoverable device has an IP address, and wherein the discoverable device's IP address is associated with the group name; and a discovering device, located on a second subnet of the network, for creating a list of known subnets and known devices on the network; for querying the name server for a list of IP addresses associated with the group name; for contacting each returned address of a discoverable device associated with the group name for the discoverable device's IP subnet information; for determining the discoverable device's subnet; and for adding the discoverable device and its subnet to the list.

The system for network device location allows a host device (e.g., a personal computer running the a printer driver installer) to locate at least one device (e.g., a printer) on each subnet. For example, once a host device locates (finds its IP address) at least one device registered with a name server under a group name, such as "Phaser 6200", it can contact that device directly. The host device then obtains additional information about the remote subnet from the discovered device. The host device can use that information to search for additional devices on the same subnet as the discovered device.

DETAILED DESCRIPTION OF THE EMBODIMENTS

Figure 1:
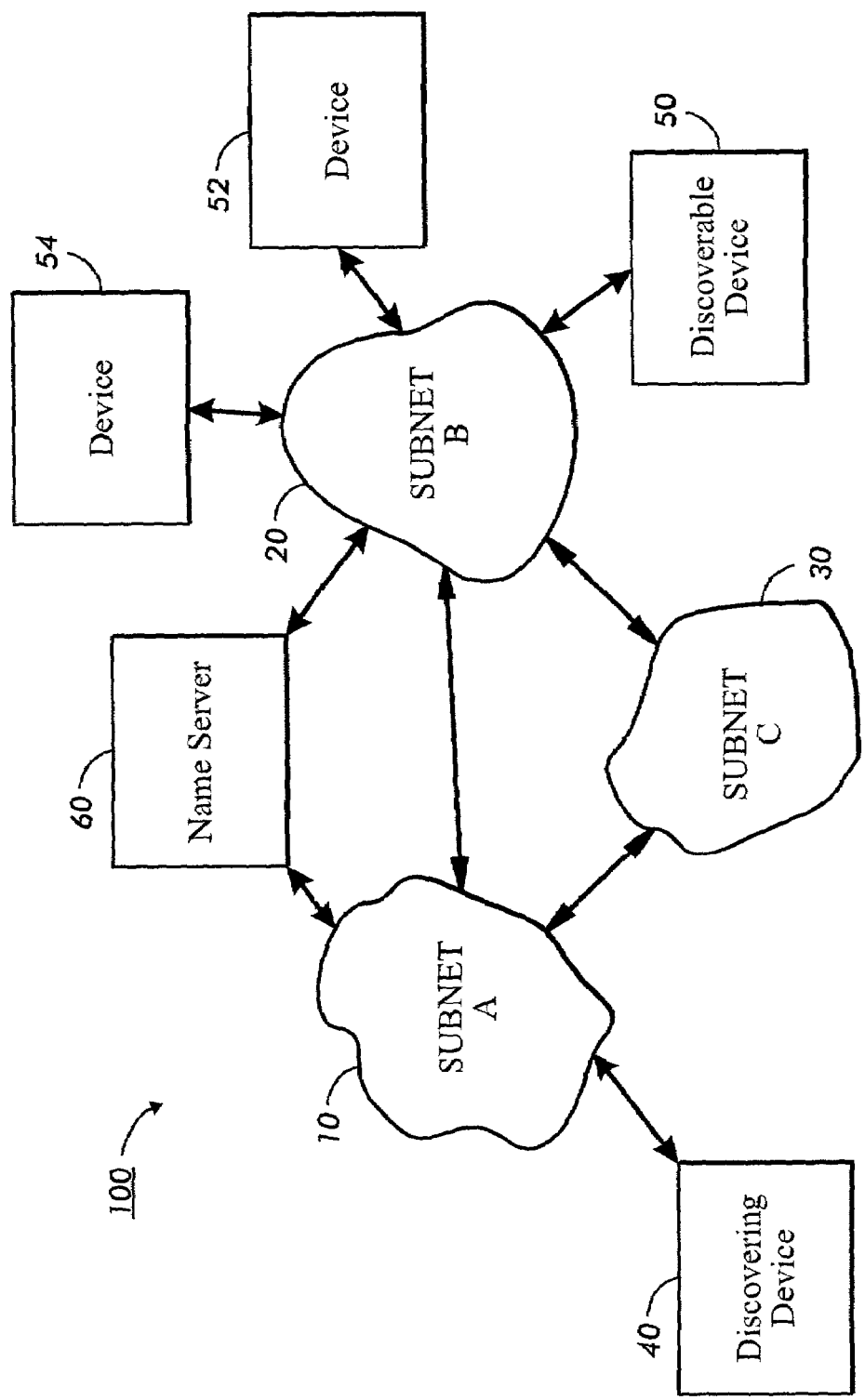
FIG. 1 is a block diagram of a system for network device location.

Referring to FIG. 1, a system for locating devices on a network 100 includes a discovering device 40 on a first subnet 10 of network 100 and at least one discoverable device 50 located on a second subnet 20. Both discovering device 40 and discoverable device 50 may be located on the same subnet. Also includes in a name server 60. The system applies to any device location on a network, but may be used to find printers on a local area network. In this case, the discovering device might be a host device, such as a personal computer and the discoverable device might be a printer. Once discovering device 40 locates discoverable device 50 on subnet 20, discovering device 20 can obtain other information from discoverable device 50 about its subnet 20 so that discovering device 40 can locate other devices 52 and 54 on subnet 20.

At least one of the discoverable devices 50 on a given subnet 20 must be assigned an IP address and IP subnet information, such as its IP netmask, and IP router address. Any well-known method of assigning this information may used, and will probably depend on the type of network being run. For example, this information may be obtained from a network DHCP (Dynamic Host Configuration Protocol) or BOOTP server, software running on a personal computer or other device on the subnet, from the device's front panel, or any other method.

Discoverable device 50 must also know the address of a network-wide address server 60. Name server 60 may be any name server, such as a NBNS (NetBIOS Name Service) or dynamic DNS (Domain Name Service) server, which is capable of supporting a "group name" registration. A "group name" is a single name which can be associated with more than one network address. Many local area networks have a DHCP server and a Microsoft WINS (Windows® Name Service) server on the network. (WINS is Microsoft's proprietary implementation of the NetBIOS Name Service.) On Linux and Unix systems, a DNS name server may be used or names may be registered with SAMBA.

There is at least one "group name" which is known to both the discoverable device 50 and the discovering device 40. For example, the group name might be the discoverable devices' manufacturer or model name or model number. In the example where a user wishes to install a printer driver from his personal computer, the group name might be the printer's model and manufacturer (such as Phaser 6200).

When discoverable device 50 was installed on the subnet 20, after being configured with an IP address, IP netmask and IP router address, discoverable device 50 contacted name server 60 and added its network address to the at least one group name, say "Phaser 6200".

The discovering device 40 constructs a list or table of known IP subnets. The list or table is initially empty. The discovering device 40 may add known subnets to the list or table (e.g., if it knows about subnet 30 it can add subnet 30 to the list). Information about these subnets may be obtained from the discovering device's own network configuration (i.e., directly attached subnets, e.g., subnet 10), from an operator or user, from previous operation of the discovering device, or other sources.

The discovering device 40 queries the name server 60, for a list of addresses associated with the well-known group name "Phaser 6200". If there are more than one name server on the network 100, discovering device 40 may query additional name servers for addresses associated with the group name Phaser 6200.

The name server 60 returns a list of zero or more addresses. Some name servers may return a complete list of registered addresses. Other name servers (e.g., WINS) may return a partial list. The system and method of device location does not require that the name servers return a complete or accurate list. The system and method will locate all the discoverable devices on the network if the name server returns at least one address of a discoverable device on each subnet. In this case, name server returns the IP address of discoverable device 50 which has previously registered with it under the group name Phaser 6200.

The discovering device 40 contacts each of the devices in the list returned from the name server to obtain the device's IP netmask and, optionally, the device's IP router address. In this case, given discoverable device 50's IP address, discovering device 40 can contact it directly and query it for additional information. By having the discoverable device 50's IP netmask (and optionally the IP router address) for subnet 20, discovering device 40 can determine or compute the discovered device 50's subnet number and subnet broadcast address. If the discovered device 50's subnet is not already in the discovered subnet list, the discovering device 40 adds the new subnet to the list. In this case, discovering device 40 add subnet 20 to its list which contains at least subnet 10 (discovering device 40's own subnet).

The discovering device 40 can now use a separate discovery protocol to find additional devices on each of the discovered subnets. Any discovery protocol may be used. All that is required is that the discovering device 40 have some means of locating discoverable devices on a subnet, given the subnet broadcast address or the range of IP addresses in the subnet. For example, discovering device 40 can use the protocol described in the 935 application to discover other devices on subnet 20. Devices 52 and 54 may not have been assigned an IP address yet or they may not have been included in the list of addresses returned by the name server 60.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of locating devices on a network, comprising:
    identifying a group name associated with a device to be discovered on the network, wherein the group name is associated with multiple devices having multiple addresses on the network;
    creating a list of known subnets and known devices on the network upon identifying a group name associated with a device to be discovered on the network;

querying a name server on at least one of one of the known subnets for a list of IP addresses associated with the group name and obtaining a list of returned addresses associated with devices associated with the group name;

contacting each returned address associated with the group name for a returned device's IP subnet information;

determining which of the returned devices is a discovered device;

determining the discovered device and its subnet to the list of known subnets and known devices on the network.

2. The method of claim 1, further comprising:

using another discovery protocol to find additional devices on each identified subnet; and adding each discovered device to the list of known subnets and known devices on the network.

3. The system of claim 2, wherein the discovery protocol comprises a broadcast-based discovery protocol.

4. The method of claim 1, wherein the discovered device's IP subnet information comprises its IP netmask and its IP router address.

5. The method of claim 1, wherein the group name comprises one or more of a device manufacturer, a model name and a model number.

6. A system for network device location, comprising:

an address server for associating IP addresses of devices on the network with a group name, wherein the group name is associated with multiple devices having multiple addresses on the network;

a discoverable device located on a first subnet of the network, wherein the discoverable device's IP address is associated with the group name; and a discovering device, located on a second subnet of the network, for creating a list of known subnets and known devices on the network upon identifying a group name associated with a device to be discovered on the network; for querying the name server for a list of IP addresses associated with the group name and obtaining a list of returned addresses associated with devices associated with the group name; for contacting each returned address of each discoverable device associated with the group name for each discoverable device's P subnet information; for determining which of the returned devices is the discoverable device; for determining the discoverable device's subnet; and for adding the discoverable device and its subnet to the list of known subnets and known devices on the network.

7. The system of claim 6, wherein the discovering device further comprises a discovery protocol for finding additional devices on each identified subnet;

and for adding each discovered device to the list of known subnets and known devices on the network.

8. The system of claim 7, wherein the discovery protocol comprises a broadcast-based discovery protocol.

9. The system of claim 6, wherein the discovered device's IP subnet information comprises its IP netmask and its IP router address.

10. The system of claim 6, wherein the group name comprises at least one of a device manufacturer, a device model name and a model number.

11. The system of claim 6, wherein the name server comprises a WINS server.

* * * * *